United States Patent
Campbell

[11] Patent Number: 6,095,742
[45] Date of Patent: Aug. 1, 2000

[54] CENTER COLUMN AND STORED MATERIAL SUPPORT AND TRANSFER STRUCTURE FOR RECLAIMER

[75] Inventor: Colin D. Campbell, West Jordan, Utah

[73] Assignee: Cambelt International Corporation, Salt Lake City, Utah

[21] Appl. No.: 09/150,131

[22] Filed: Sep. 9, 1998

[51] Int. Cl.[7] .................................................. B65G 65/30
[52] U.S. Cl. ......................... 414/319; 414/313; 222/411; 198/493; 198/518; 406/53
[58] Field of Search ................................ 406/57, 58, 55, 406/61, 53; 414/313, 319, 317, 320, 321, 322, 305, 306, 310, 311, 312; 198/493, 518; 222/410, 411, 412, 413

[56] References Cited

U.S. PATENT DOCUMENTS

| | | | |
|---|---|---|---|
| 2,649,215 | 8/1953 | Dickson | 414/313 |
| 3,127,032 | 3/1964 | Roberts | 414/310 |
| 3,237,788 | 3/1966 | Weaver et al. | 414/311 X |
| 3,456,818 | 7/1969 | Massey . | |
| 4,875,820 | 10/1989 | Lepp et al. | 414/310 X |
| 5,449,263 | 9/1995 | Campbell . | |

FOREIGN PATENT DOCUMENTS 1032110  3/1953  France ................................... 414/313

*Primary Examiner*—Frank E. Werner
*Attorney, Agent, or Firm*—Thorpe, North & Western, LLP

[57] ABSTRACT

An enclosed granular or powdered material storage reclaimer, having a floor, a vertical column at the center of the floor, conveyor means disposed below the floor, elongate transfer device hingedly attached to the column, an anchor pedestal for anchoring the bottom end of the column to a footing structure below, and a downwardly directed annular opening formed in the center of the floor, said opening having an inside wall and an outside wall, said annular opening being concentric with the vertical axis of the column and designed to receive granular or powdered material transported there by the elongate transfer device, such that the column may be directly supported by the anchor pedestal and the footing structure, and the conveyor means need not be located directly beneath the center of the column. Such an enclosed granular or powdered material storage reclaimer wherein the conveyor means comprises an air slide conveyor. Such an enclosed granular or powdered material storage reclaimer wherein the floor is sloped downward and away from its center.

22 Claims, 3 Drawing Sheets

CENTER COLUMN AND STORED MATERIAL SUPPORT AND TRANSFER STRUCTURE FOR RECLAIMER

BACKGROUND OF THE INVENTION

1. Field of the Invention

This invention relates to material storage and transfer facilities for bulk granular and powdered material storage. More particularly, the present invention relates to an improved support structure for the rotating center column and auger transfer apparatus typically used in dome storage structures.

2. State of the Art

Many granular and powdered bulk materials require a controlled storage environment and unique handling profile during loading and unloading in storage areas. For example, grain, portland cement, fly ash, dry fuels, and other such commodities must be totally enclosed and protected from the elements when stored. However, the total enclosure of bulk materials limits convenient access for retrieval, making quick and complete reclamation difficult. Although movable roofing permits direct use of scoop shovels and buckets to raise the material to nearby trucks or railcars, such facilities and methods are labor intensive and require a significant capital investment for equipment and special construction of buildings.

There are many well known methods for the storage and retrieval of such materials. One method that has gained widespread popularity in recent years is the use of dome structures for storage. Free-standing dome structures, such as disclosed in U.S. Pat. No. 3,456,818, are extremely strong and space efficient, requiring a minimum of materials to obtain a large volume of enclosed space. They are also relatively inexpensive to construct as, for example, by thin-shell concrete balloon forming methods.

Additionally, reclamation of materials from an enclosed storage location may present significant challenges due to the nature of the material. For example, dry portland cement settles and compresses when stored, creating a compact and dense mass that can be difficult to remove. If this material is sought to be removed by a front-end loader through lateral doors at the base of a storage enclosure, the compressed cement may not readily collapse with removal of under-supporting material, allowing the creation of a sizable cavern within the material. This cavern could collapse suddenly, with disastrous results.

To solve these sorts of problems, automated reclamation devices for use within domed material storage structures have been developed. For example, U.S. Pat. No. 5,449,263 and prior patents disclose a free-standing domed storage structure having a mechanical reclaimer installed therein. Such a system is shown in FIG. 1. These reclaimers typically comprise a rotating vertical column 16 in the center of the dome storage structure 10, with one or more elongate material transfer structures 40 and 41 attached thereto. These transfer mechanisms are necessarily shorter than the radius of the dome so as not to contact the inside surface of it. The transfer mechanisms typically employ auger devices 17 and 18 to move material, and are usually attached to a bridge type structure that is attached to the bottom of the column via a hinge 42, and connected to the top of the column via a cable 61 and winch device. The column is rotated by a drive motor 60 located at the top of the center column, with auger drive motors 62 positioned at the distal ends of the transfer structures. The cable 61 and winch mechanism allows the transfer structures to be selectively raised or lowered to contact the surface of the stored material.

The domed storage structure is typically filled via a conveyor 12 or similar transport mechanism that drops material into the dome through an opening 13 in the top center. Upon filling, the center column and transfer mechanism are designed to be buried in the stored material with the elongate transfer bridge retracted to an upright position as shown. When the material is to be reclaimed, sufficient quantity of material is removed from the dome by some means that allows pure gravity flow of the material into an outlet opening 19. Then the transfer bridge structures 40 and 41 are lowered to the material surface, and as the column slowly rotates about its central axis 22, the augers sweep and drag the stored material toward the bottom center of the interior of the dome in a gradually declining conical motion, where, at the base of the column, some means is employed to gather the material and transport it under the floor of the dome. Such gathering and transporting mechanisms have in the past employed a gathering chute 24 directly beneath the center column, which drops the material onto a conveyor belt system 82 in a tunnel 80 beneath the dome floor, as shown in FIG. 1.

However, this typical arrangement presents several problems that have not previously been solved in the industry. The center column of these material storage facilities imposes enormous structural loads at its base due to its own weight and the weight of the transfer mechanisms attached thereto. For example, typical storage domes may be upwards of 100' tall, having a 48" diameter steel center column, with a very large rotational drive motor and gear box mounted on top, and substantial appurtenant structures such as maintenance platforms, hatches, ladders, hinged bearing, and winches, etc., in addition to the transfer mechanism bridges and their drive motors. Additionally, the weight of the stored material imposes even more significant loads upon the column and transfer bridges. For example, as dry cement is poured into the structure, it settles on all exposed surfaces of the column, transfer structure, and auger blades. Because it settles naturally through the air in the dome, at first the cement is light and aerated. However, as the cement piles up, its weight compresses the layers underneath. This gradual compressing and densification of the cement causes it to impose a substantial portion of its weight on the exposed surfaces of the column, transfer structure, and especially the auger blades which present nearly horizontal surfaces when the transfer structure is in the upright position. Thus a significant portion of the weight of the stored material is borne by the center column, instead of the floor of the dome. The inventors have calculated that loads imposed by the center column in such structures may exceed 1.5 million pounds.

The magnitude of the column loads causes a problem for transfer of the granular or powdered material into the subsurface conveyor. The column necessarily passes through the center of the dome, which is also the focal point to which the transfer augers drag the material. In past structures, the center column is supported on massive vertical structural plates crossing at right angles through the center of the column, which are in turn supported at their perimeter on massive steel beams. These beams are then supported by the walls of an underground tunnel or other foundation providing support at the corners of a square or similar arrangement. The crossed plates and perimeter support provide for an opening essentially through the center of the column at its base, into a chute that is coaxial with the column, yet has no center obstruction. The material can then drop onto a conveyor which passes beneath the center of the column between the tunnel walls or other foundation which supports the column. This arrangement allows for satisfactory handling of the material, but is extremely expensive and labor intensive to construct. It would be advantageous to have a means of supporting the center column which allows the column to transmit its heavy structural loads more directly into its foundation, yet still allow the easy gathering and transport of the granular or powdered material at the base of the column.

Additionally, the weight of the stored material imposes significant loads on the conveyor tunnel beneath the floor of the structure. Such tunnels may be 10' to 12' tall, and equally as wide in order to accommodate the conveyor equipment and maintenance personnel as needed. Because of this size, the tunnels are expensive to construct due to the significant structural loads that must be borne. It would be advantageous to incorporate a material conveyor means into such domed storage structures that does not require such a large subsurface tunnel so as to reduce the cost and complexity of the structure.

OBJECTS AND SUMMARY OF THE INVENTION

It is therefore an object of the present invention to provide a means of supporting the center column and appurtenant structures of a domed granular and powdered material storage and reclamation facility which allows the column to transmit its heavy structural loads more directly into its foundation, yet still allows the easy gathering and transport of the granular and powdered material at the base of the column.

It is another object of this invention to provide an underground material conveyor means for a domed granular and powdered material storage and reclamation facility that does not require a large subsurface tunnel.

The above and other objects are realized in a granular and powdered material storage reclaimer comprising a confined enclosure having a vertical column with its bottom end located at the center of the enclosure floor, and elongate transfer means hingedly attached to the column near its bottom end. The bottom end of the column is structurally supported by an anchor means which extends vertically to a footing below. The floor of the enclosure comprises a downwardly directed annular opening formed around and concentric with the column anchor means, and designed to receive granular and powdered material transported there by the elongate transfer means. Conveyor means are disposed beneath the floor of the enclosure, adjacent to and communicating with the annular opening, for transporting the granular and powdered material away from the enclosure, but need not be located directly beneath the center of the column.

Some of the above objects are also realized in a granular and powdered material storage reclaimer as described above, wherein the conveyor means comprises an air slide conveyor such that only a small conveyor conduit is needed beneath the floor of the enclosure.

Other objects and features of the present invention will be apparent to those skilled in the art, based on the following description, taken in combination with the accompanying drawings.

DETAILED DESCRIPTION OF THE PREFERRED EMBODIMENT

Figure 1:
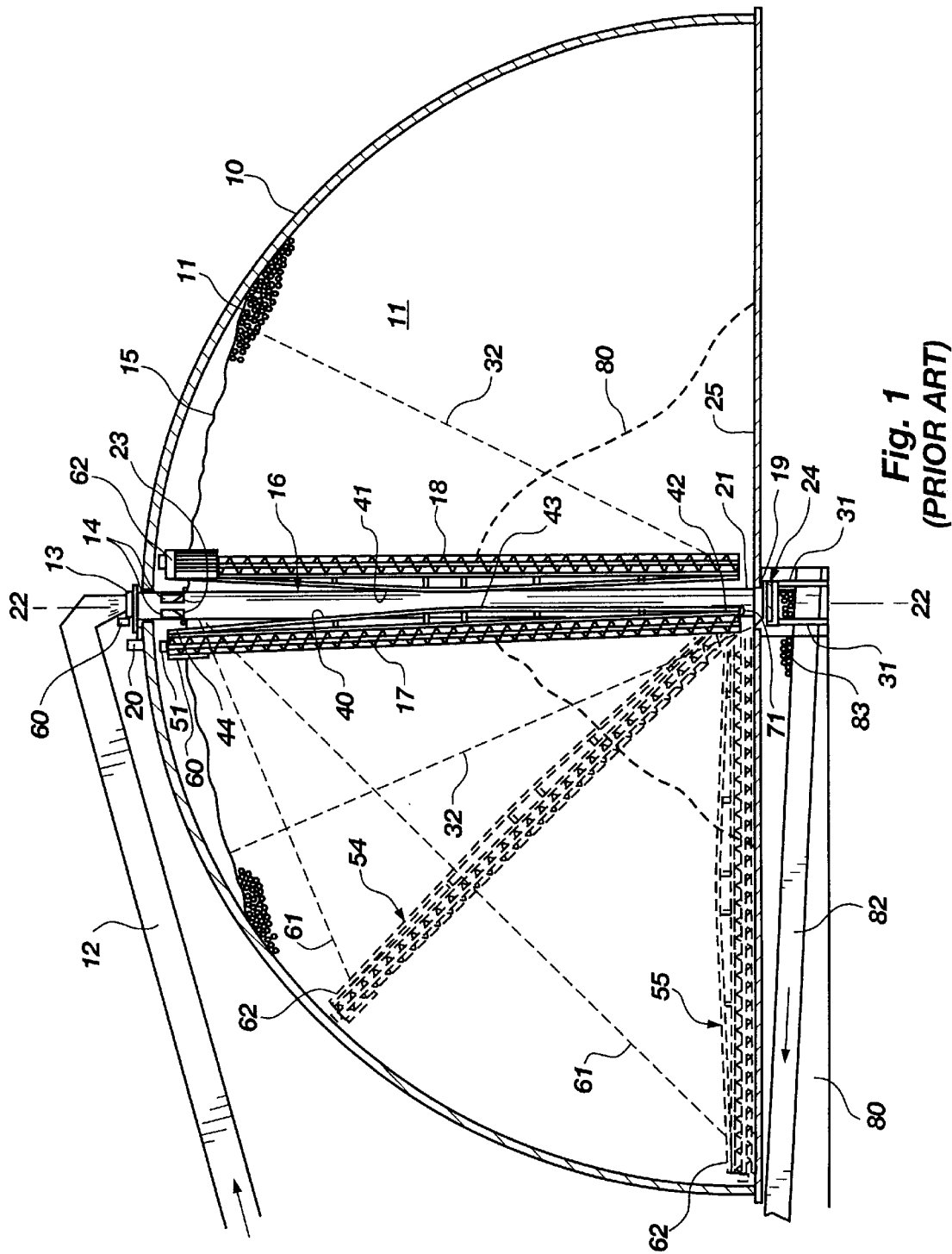
FIG. 1 provides a medial cross section of a prior art hemispherical dome storage structure.

Referring now to the drawings:

FIG. 1 provides a medial cross section of a prior art hemispherical dome reclaimer structure. These reclaimers typically comprise a rotating vertical column 16 in the center of the dome storage structure 10, with one or more elongate material transfer support frames 40 and 41 attached to the bottom of the column via a hinge 42, and connected to the top of the column via a cable 61 and winch device. Auger mechanisms 17 and 18 are attached to the support frames, with a column rotation motor 60 mounted on top of the column 16, and auger drive motors 62 attached to the distal ends of the transfer structures. The cable 61 and winch device allows the transfer support structures and auger mechanisms to be selectively raised or lowered to any angle of declination, shown for example at 54 and 55, so as to contact the surface of the stored material 11. It will be appreciated that the transfer support frames and auger mechanisms are necessarily of a length less than the radius of the dome 10 so as not to contact the inside surface of it at any angle of declination.

In the prior art storage and reclamation facilities, the column 16 has a rotatable base 21 which allows the column 16 and all appurtenant structure to be rotated about the column's vertical axis 22. Directly beneath the column 16 is an opening 19 leading to a chute 24 which allows granular material to drop onto a conveyor belt system 82 in a tunnel 80 beneath the dome floor 25. This arrangement is shown in more detail in FIG. 2, which shows a partial cross-sectional view at the base of the center column of the prior art structure. It will be apparent to those skilled in the art that the column 16 and all appurtenant structural loads are imposed through the base 21 directly into the cross members 30 and chute assembly 24. In a typical configuration, the cross members 30 form a cross through the center of the base of the column, and are formed of 3" thick structural steel plate. These plates are welded at their perimeter to heavy cross beams 29 that are supported by the walls of a tunnel 80 located beneath the floor 25 of the structure. The chute 24 is also connected about the perimeter of the cross members and serves to guide the falling material toward the conveyor 82. This cumbersome structural arrangement is necessitated by the desirable placement of the chute 24 and conveyor 82 directly below the center 22 of the column so as to be located at the focus of the material to be conveyed. The conveyor 82 is located in a tunnel 80 beneath the dome floor 25, which extends beyond the perimeter of the structure to some desired location for transfer of the granular materials.

When in use, the domed storage structure is typically filled via a conveyor 12 or similar transport mechanism that drops material into the dome through an opening 13 in the top of the structure. Upon filling, the center column and transfer mechanism are buried up to some level 15 in the stored material with the elongate transfer bridges 40 and 41 retracted to an upright position as shown by the solid lines in FIG. 1. When material is to be reclaimed, first a sufficient quantity of material is removed from the bottom center of the dome, into the chute and conveyor means, by some means such as air injection, which allows a generally conical volume of material in the center of the dome to collapse from the bottom up, and fall into the opening 19 by operation of gravity, leaving a material surface 32. Once a conical volume of material has been removed, and the remaining material in the dome forms a conical slope pointing toward the base of the column at some angle of repose such that gravity alone will no longer be sufficient to move the material toward the outlet, the transport auger mechanisms are then engaged to drag the material along the slope 32 toward the outlet 19. The transfer bridge structures are lowered to the material surface 32 with the augers 17 and 18 rotating, and as the center column 16 slowly rotates about its vertical axis 22, the augers sweep around the surface of the material in a slowly declining conical motion, and drag the stored material toward the outlet 19 at the base of the column 21.

Figure 2:
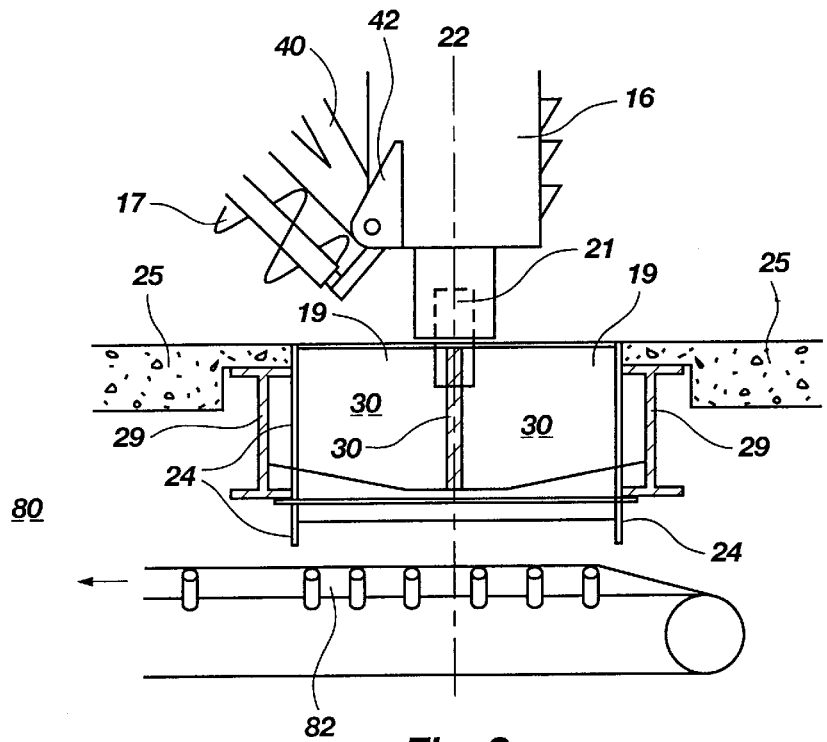
FIG. 2 shows a partial cross-sectional view at the base of the center column of the prior art structure.
Figure 3:
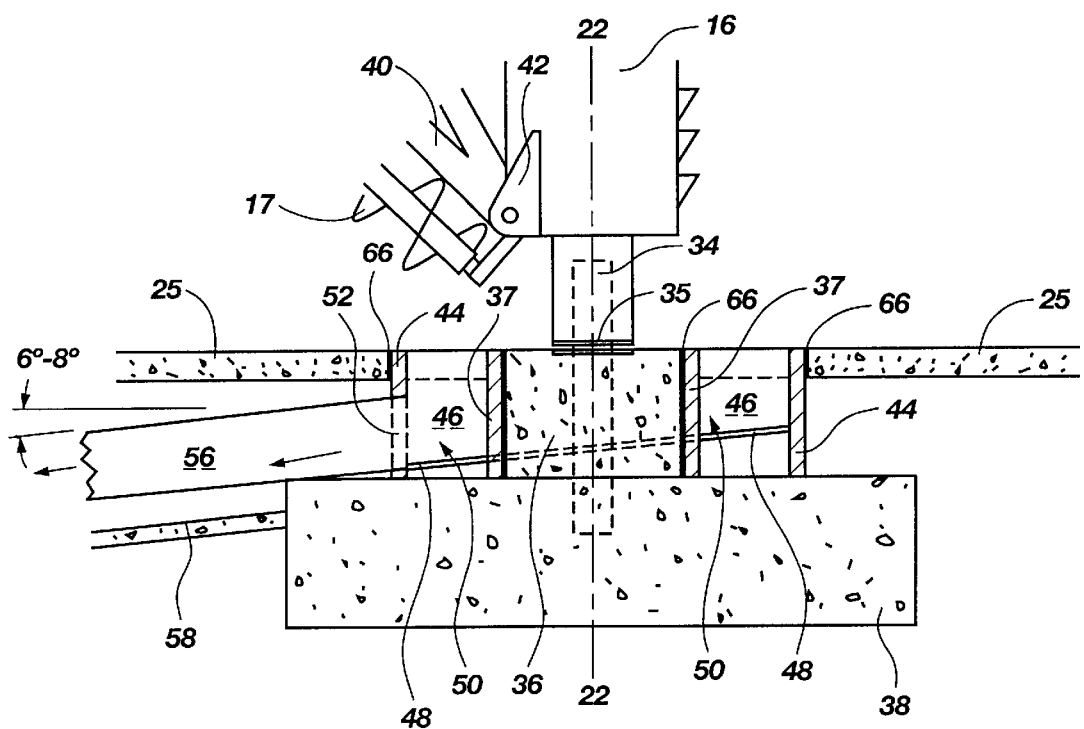
FIG. 3 shows a partial cross-sectional view at the base of the center column of the present invention.
Figure 4:
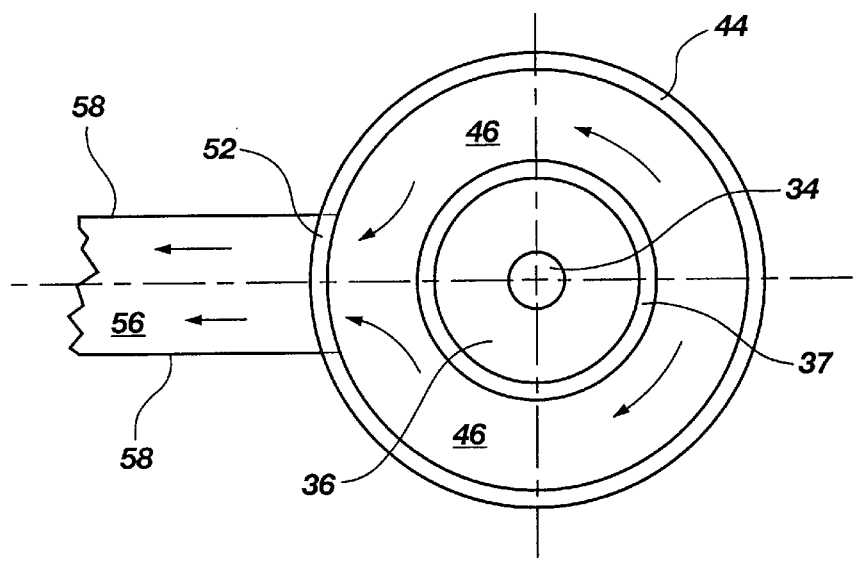
FIG. 4 shows a plan view of the annular material opening of the structural support of the present invention.

As mentioned above, the center column of these material storage facilities imposes enormous structural loads at its base due to its own weight and the weight of the transfer mechanisms attached thereto. It will be appreciated that because of these loads, the configuration of the prior art rotating column base and material gathering chute as depicted in FIGS. 1 and 2 is complicated, costly, and labor intensive to construct. Likewise, the large conveyor tunnel of the prior art endures large structural loads, and is complicated and costly. To solve these problems, the present invention presents an improved reclaimer center column support and transfer structure, as shown in FIGS. 3 and 4. FIG. 3 shows a partial cross-sectional view at the base of the center column 16. The center column 16 is supported upon a short rotating base 34, which extends into and is structurally affixed to a short anchor column 36 and footing 38. The rotating base 34 is preferably constructed of structural steel and compatible components to provide for a reliable and strong sealed bearing structure 35 that will freely pivot about the vertical axis 22, will support the heavy loads of the column, and will not degrade when buried in the granular or powdered material anticipated to be stored in the structure. The anchor column 36 is preferably a short cylindrical column of reinforced concrete designed to bear the anticipated column loads. In the preferred embodiment the height to diameter ratio of this anchor column is approximately 3 to 4, but may vary depending on the size of the storage structure and expected loads. The anchor column 36 and rotating base 34 in turn are supported by a footing 38, also of reinforced concrete, which bears on the subsoils at the site of the structure.

An annular opening 46 is formed around the column base 34 by a cylindrical outer wall 44 and cylindrical inner wall 37 that encircle the anchor column 36 and are supported by the footing 38. Between the walls 44 and 37 is a sloping floor 48 that assists in the transport of the granular or powdered material as will be described. In a preferred embodiment, the walls 44 and 37, and the floor 48 are prefabricated components of an "air slide" conveyor system, and will advantageously be anchored into the concrete floor 25 and related cast-in-place concrete structure.

Alternatively, the cylindrical walls 44 and 37 and sloping floor 48 may be formed of cast-in-place concrete supported by the footing 38. In such an alternative configuration the outside surface of the anchor column 36 could form the inside wall 37 of the annular opening 46. The diameter and thickness of the cylindrical wall 44 will vary depending on the size of the storage structure and the intended discharge rate of the reclamation facilities. The sloped bottom 48 of the annular opening 46 preferably comprises an aerated ring, wherein the sloped bottom is gas permeable, and the granular material is aerated by means of air forced up through the sloped bottom. When the granular material is thus aerated, it freely flows or slides under the force of gravity toward the outlet 52.

In an operative example, a 165 ft. diameter powdered cement storage structure will have an anchor column 36 that is 4 ft. in diameter, and a cylindrical wall 44 that is 10 ft. in diameter and 3 ft. high. This arrangement provides for a 3 ft. wide by 3 ft. deep (max.) annular opening encircling the anchor column. A plan view of the anchor column, cylindrical wall, and the annular opening as described is given in FIG. 4.

The cylindrical wall 44 comprises one or more outlet openings 52 which communicate with a conveyor means 56. In a preferred embodiment, the conveyor means comprises an air slide conveyor located in a conduit or tunnel 58 buried beneath the floor 25 of the dome, and sloping down and away from the center of the dome. A preferred slope is 6° to 8°, which is ideal to assist dry powdered cement in its motion.

It will be appreciated that the anchor pedestal 36 and footing 38 could transfer substantial structural loads into the floor 25 or cylindrical wall 44 if these components are not structurally isolated. This situation is undesirable because it can induce significant cracking of the floor, or can cause deformation, misalignment, or malfunction of the underground conveyor and dispensing outlet means which are attached to the cylindrical wall such as when the column footing settles. For this reason, one embodiment of the present invention incorporates isolation joints 66 between the floor 25 and the cylindrical wall 44, and between the anchor column 36 and the inside wall 37. These joints may be constructed in many ways, such as with fiber joint filler material or by the use of chemical bond inhibitors applied to the cylindrical wall surface 44 when an adjacent concrete element is placed. It will be apparent to those skilled in the art that only minimal connecting reinforcement should be provided between such adjacent concrete elements so as to prevent transmission of significant loads.

Figure 5:
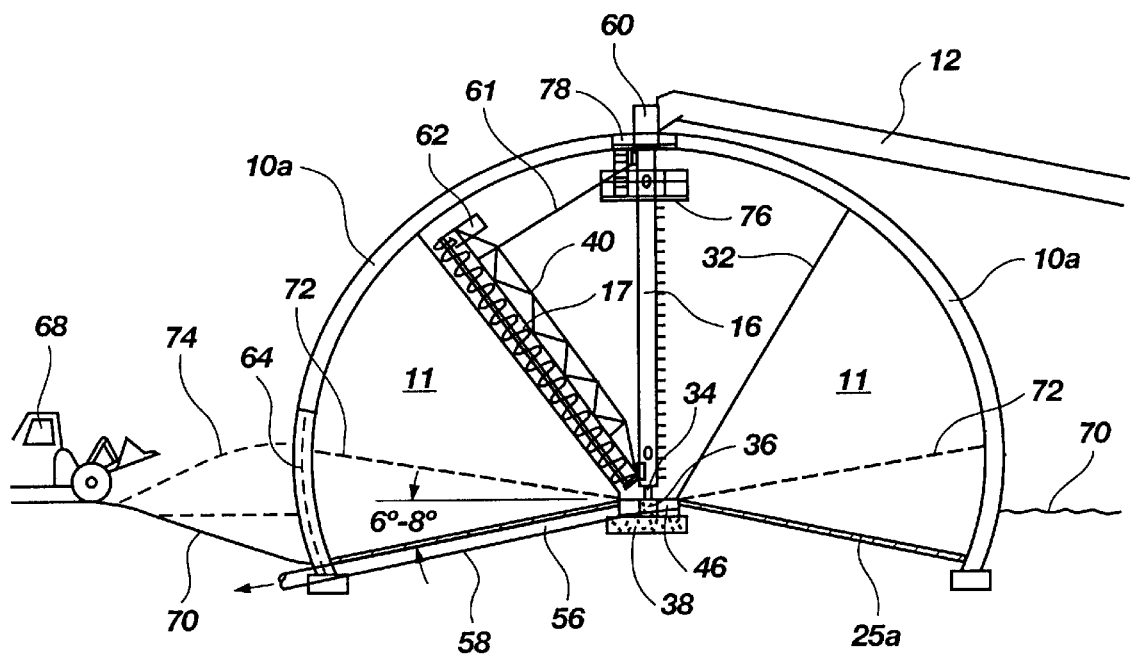
FIG. 5 shows a medial cross section of a greater than hemispherical dome storage structure of the present invention.

FIG. 5 shows a medial cross section of a greater than hemispherical dome storage structure showing one embodiment of the present invention. In operation, after pure gravity flow has ended, the transfer structure 40 is lowered onto the material surface 32, and the auger 17 draws the material toward the base of the column, where it falls into the annular opening 46. The aeration jets 50 aerate the material, making it able to flow like a fluid, and direct it toward the outlet opening 52. From that point the granular or powdered material is transported beyond the perimeter of the structure through the conduit 58 and disposed of as desired.

The embodiment of the air slide conveyor as depicted in FIG. 5 presents several distinct advantages to the present invention. This embodiment is made possible by the downward slope of the air slide conveyor. With the floor 25a of the dome sloped at the same slope as the conveyor conduit 58, a greater than hemispherical dome 10a can be constructed. This provides a greater storage capacity for a dome of a given diameter, making these installations even more efficient and economical. For example, with a 6° to 8° floor slope, as is currently preferred, the dome will have a 7% to 8% greater storage capacity than a dome of the same diameter with a flat floor, for minimal additional construction cost. The drive motors 62 are designed so that when the structures 40 and 41 are fully lowered so as to contact the sloped floor 25a, in a manner similar to that labeled 55 in FIG. 1, the auger transfer mechanisms 17 and 18 are capable of lifting and dragging the granular or powdered material up the sloped floor to the annular opening 46, allowing full utilization of this additional capacity.

In addition to many of the elements of the prior art structure depicted in FIG. 1, this embodiment includes many features that represent an improvement over the prior art. For example, near the top of the column 16 is an observation platform 76 and access hatch 78 for maintenance worker access to the top of the interior of the dome 10a. In addition, the embodiment of FIG. 5 allows easier interior access for vehicles such as a front-end loader 68 through an access door 64 in the side of the dome when needed for maintenance, complete cleanout, etc. This may be required from time to time to prevent mixing of, for example, different grades, colors, types, etc. of powdered cement. Many similar structures without the internal mechanical reclamation structure described above require a floor 72 that is sloped toward the center of the dome rather than away from it to assist in material recovery. In such a configuration, because the perimeter of the floor 72 is above the ground level 70 outside the dome, a ramp 74 would be required to allow vehicle access through an access door in the side of the dome.

The air slide conveyor also avoids the need for providing a large tunnel beneath the floor of the structure. In the illustrative prior art example of FIG. 1, the conveyor tunnel 80 is approximately 12 ft. square in cross section. When the material storage structure is filled, the loads on this tunnel are enormous. With an air slide conveyor buried beneath the floor of the dome, or alternatively located in a trench beneath the floor of the dome, the conveyor conduit requires only a 3 ft. to 4 ft. deep trench to install. This presents a significant reduction in the load placed on the tunnel or conduit, and consequently provides significant savings in construction labor and material costs, and is a great improvement over the prior art.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A center column support structure for a granular or powdered material storage enclosure having a floor, a vertical column with a bottom end, a top end, a vertical axis and being rotatable about said vertical axis, and having its bottom end approximately centrally located in the enclosure floor, and elongate transfer means hingedly attached to said column near the bottom end thereof so as to allow variable declination of the transfer means onto the top surface of the granular or powdered material, and configured for dragging the granular or powdered material along the transfer means toward the bottom end of the column, said support structure comprising:

an anchor pedestal for supporting the bottom end of the column at an approximate level of the enclosure floor;

a footing structure supporting said anchor pedestal and the column;

an annular opening formed in the center of the floor of said enclosure and open to the floor surrounding the bottom of the column, said annular opening configured to receive the granular or powdered material from the floor of the enclosure around the annular opening when the storage enclosure is substantially full of the granular or powdered material, having an inside wall and an outside wall and being configured to (i) surround the anchor pedestal, and (ii) receive the granular or powdered material from the elongate transfer means;

conveyor means disposed beneath the floor of said enclosure and in communication with at least a side of the annular opening for transporting the granular or powdered material directly from the annular opening away from the enclosure; and pressurized air inlets communicating with the annular opening and the conveyor means, for creating a continuous flow of aerated granular or powdered material from the annular opening through the conveyor means.

2. The apparatus as described in claim 1 wherein said annular opening is concentric with the vertical axis of the column.

3. The apparatus as described in claim 1 wherein said downwardly directed annular opening comprises an aerated ring.

4. The apparatus as described in claim 1 wherein said conveyor means comprises an air slide conveyor.

5. The apparatus as described in claim 4 wherein said air slide conveyor is inclined at an angle of from 6° to 8° downward and away from the bottom end of the vertical column.

6. The apparatus as described in claim 1 wherein said anchor pedestal comprises a steel reinforced concrete pedestal.

7. The apparatus as described in claim 6 wherein:

said enclosure comprises a dome storage structure having an inside radius and a center that is coincident with the center of the enclosure floor.

8. The apparatus as described in claim 7 wherein:

said elongate transfer means comprises a contacting face, a base end, and a distal end, and is of a length somewhat less than the inside radius of the dome structure;

and further comprising:

an elongate support frame for supporting the elongate transfer means, said support frame having a base end, intermediate support section, and distal end, and being of a length less than the inside radius of the dome structure;

rotational drive means for rotating the column about its vertical axis;

rotational declination means coupled to the distal end of the support frame and the top end of the column whereby the elongate transfer means and support frame may be selectively rotated about the hinged connection at the base of the column from an orientation substantially parallel to and in contact with the floor of said structure, to an orientation nearly parallel to the column, and whereby the contacting face of the elongate transfer means may be brought into contact with the top surface of the granular or powdered material in a rotational, conical path when the column is rotated about its vertical axis so as to remove successive conical layers of the granular or powdered material.

9. The apparatus as described in claim 8 wherein said floor is radially inclined at an angle of from 6° to 8° downward and away from the center of said structure.

10. The apparatus as described in claim 8 further comprising a plurality of elongate transfer means hingedly attached to the column near the bottom end thereof.

11. The apparatus as described in claim 1 wherein the annular opening is configured to fill with the granular or powdered material when the storage enclosure is filled.

12. A center column support structure for a granular or powdered material storage enclosure having a floor, a vertical column with a bottom end, a top end, a vertical axis and being rotatable about said vertical axis, and having its bottom end approximately centrally located in the enclosure floor, and elongate transfer means hingedly attached to said column near the bottom end thereof so as to allow variable declination of the transfer means onto the top surface of the granular or powdered material, and configured for dragging the granular or powdered material along the transfer means toward the bottom end of the column, said support structure comprising:
   an anchor pedestal for supporting the bottom end of the column at an approximate level of the enclosure floor;
   a footing structure supporting said anchor pedestal, the column, and all appurtenant structure;
   an annular opening formed in the center of the floor of said enclosure and open to the floor surrounding the bottom of the column, said annular opening configured to receive the granular or powdered material from the floor of the enclosure around the annular opening when the storage enclosure is substantially full of the granular or powdered material, having an inside wall and an outside wall, and surrounding the anchor pedestal, and designed to receive the granular material transported there by the elongate transfer means;
   structural isolation means associated with the annular opening and disposed between the floor and the footing structure and anchor pedestal, whereby structural loads imposed upon the anchor pedestal and the footing structure are not transmitted into the floor;
   conveyor means disposed beneath the floor of said enclosure and in communication with at least a side of the annular opening for transporting the granular or powdered material directly from the annular opening away from the enclosure; and
   pressurized air inlets communicating with the annular opening and the conveyor means, for creating a continuous flow of aerated granular or powdered material from the annular opening through the conveyor means.

13. The apparatus as described in claim 12 wherein said downwardly directed annular opening is concentric with the vertical axis of the column.

14. The apparatus as described in claim 12 wherein:
said annular opening comprises an aerated ring; and
said conveyor means comprises an air slide conveyor.

15. The apparatus as described in claim 14 wherein:
said enclosure comprises a dome storage structure;
the vertical axis of the column is colinear with the vertical, radial axis of the dome structure; and
said elongate transfer means comprises a contacting face, a base end, and a distal end, and is of a length somewhat less than the inside radius of the dome structure;
and further comprising:
   an elongate support frame for supporting the elongate transfer means, said support frame having a base end, intermediate support section, and distal end, and being of a length somewhat less than the inside radius of the dome structure;
   rotational drive means for rotating the column about its vertical axis;
   rotational declination means coupled to the distal end of the support frame and the top end of the column whereby the elongate transfer means and support frame may be selectively rotated about the hinged connection at the base of the column from an orientation substantially parallel to and in contact with the floor of said structure, to an orientation nearly parallel to the column, and whereby the contacting face of the elongate transfer means may be brought into contact with the top surface of the granular material in a rotational, conical path when the column is rotated about its vertical axis so as to remove successive conical layers of the granular material.

16. The apparatus as described in claim 15 wherein:
said floor is radially inclined at an angle of from 6° to 8° downward and away from the center of said structure; and
said air slide conveyor is inclined at an angle of from 6° to 8° downward and away from the center of the floor of said structure.

17. A center column support structure for a granular or powdered material storage enclosure having a floor, a vertical column with a bottom end, a top end, a vertical axis and being rotatable about said vertical axis, and having its bottom end approximately centrally located in the enclosure floor, and elongate transfer means hingedly attached to said column near the bottom end thereof so as to allow variable declination of the transfer means onto the top surface of the granular or powdered material, and configured for dragging the granular or powdered material along the transfer means toward the bottom end of the column, said support structure comprising:
   an anchor pedestal for supporting the bottom end of the column at an approximate level of the enclosure floor;
   a footing structure supporting said anchor pedestal, the column, and all appurtenant structure;
   an annular opening formed in the center of the floor of said enclosure and open to the floor surrounding the bottom of the column, said annular opening configured to receive the granular or powdered material from the floor of the enclosure around the annular opening when the storage enclosure is substantially full of the granular or powdered material, having an inside wall and an outside wall, and surrounding the anchor pedestal, and designed to receive the granular or powdered material transported there by the elongate transfer means;
   conveyor means disposed beneath the floor of said enclosure and in communication with a side of the annular opening for transporting the granular or powdered material directly from the annular opening away from the enclosure;
   pressurized air inlets communicating with the annular opening and the conveyor means, and coupled to a pressurized air source, for creating a continuous flow of aerated granular or Powdered material from the annular opening through the conveyor means; and
   structural isolation means associated with the annular opening and disposed between the conveyor means and the outside wall of the annular opening, and between the outside wall of the annular opening and the footing structure, whereby structural loads imposed upon the footing structure are not transmitted into the conveyor means.

18. The apparatus as described in claim 17 wherein said annular opening is concentric with the vertical axis of the column.

19. The apparatus as described in claim 17 wherein:
said annular opening comprises an aerated ring; and
said conveyor means comprises an air slide conveyor.

20. The apparatus as described in claim 19 wherein:

said enclosure comprises a dome storage structure;

the vertical axis of the column is colinear with the vertical, radial axis of the dome structure; and said elongate transfer means comprises a contacting face, a base end, and a distal end, and is of a length somewhat less than the inside radius of the dome structure;

and further comprising:

an elongate support frame for supporting the elongate transfer means, said support frame having a base end, intermediate support section, and distal end, and being of a length somewhat less than the inside radius of the dome structure;

rotational drive means for rotating the column about its vertical axis;

rotational declination means coupled to the distal end of the support frame and the top end of the column whereby the elongate transfer means and support frame may be selectively rotated about the hinged connection at the base of the column from an orientation substantially parallel to and in contact with the floor of said structure, to an orientation nearly parallel to the column, and whereby the contacting face of the elongate transfer means may be brought into contact with the top surface of the granular or powdered material in a rotational, conical path when the column is rotated about its vertical axis so as to remove successive conical layers of the granular or powdered material.

21. The apparatus as described in claim 20 wherein:

said floor is radially inclined at an angle of from 6° to 8° downward and away from the center of said structure; and said air slide conveyor is inclined at an angle of from 6° to 8° downward and away from the center of the floor of said structure.

22. A center column support structure for a granular or powdered material storage enclosure having a floor, a vertical column with a bottom end, a top end, a vertical axis and being rotatable about said vertical axis, and having its bottom end approximately centrally located in the enclosure floor, and an elongate transfer structure hingedly attached to said column near the bottom end thereof so as to allow variable declination of the transfer structure onto the top surface of the granular or powdered material, and configured for dragging the granular or powdered material along the transfer structure toward the bottom end of the column, said support structure comprising:

an anchor pedestal for supporting the bottom end of the column at an approximate level of the enclosure floor;

a footing structure supporting said anchor pedestal and the column;

an annular opening formed in the center of the floor of said enclosure and open to the floor surrounding the bottom of the column, said annular opening configured to receive the granular or powdered material from the floor of the enclosure around the annular opening when the storage enclosure is substantially full of the granular or powdered material, having an inside wall and an outside wall and being configured to (i) surround the anchor pedestal, and (ii) receive the granular or powdered material from the elongate transfer structure;

a conveyor disposed beneath the floor of said enclosure and in communication with at least a side of the annular opening for transporting the granular or powdered material directly from the annular opening away from the enclosure; and pressurized air inlets communicating with the annular opening and the conveyor means, for creating a continuous flow of aerated granular or powdered material from the annular opening through the conveyor means.

* * * * *